US011908169B2

(12) United States Patent
Graziosi (10) Patent No.: US 11,908,169 B2
(45) Date of Patent: Feb. 20, 2024

(54) DENSE MESH COMPRESSION

(71) Applicant: SONY GROUP CORPORATION, Tokyo (JP)

(72) Inventor: Danillo Graziosi, Flagstaff, AZ (US)

(73) Assignee: Sony Group Corporation, Tokyo (JP)

(*) Notice: Subject to any disclaimer, the term of this patent is extended or adjusted under 35 U.S.C. 154(b) by 410 days.

(21) Appl. No.: 17/317,650

(22) Filed: May 11, 2021

(65) Prior Publication Data

US 2022/0108482 A1 Apr. 7, 2022

Related U.S. Application Data (60) Provisional application No. 63/086,142, filed on Oct. 1, 2020.

(51) Int. Cl.
*G06T 9/00* (2006.01)
*G06T 19/20* (2011.01)
*G06T 17/20* (2006.01)

(52) U.S. Cl.
CPC ............ *G06T 9/001* (2013.01); *G06T 17/205* (2013.01); *G06T 19/20* (2013.01); *G06T 2219/2012* (2013.01)

(58) Field of Classification Search
CPC ....... G06T 9/001; G06T 17/205; G06T 19/20; G06T 2219/2012; H04N 19/597
See application file for complete search history.

(56) References Cited

U.S. PATENT DOCUMENTS

| | | | |
|---|---|---|---|
| 10,535,162 B2 | 1/2020 | Laroche et al. | |
| 2012/0262444 A1* | 10/2012 | Stefanoski | G06T 9/001 345/419 |
| 2015/0221131 A1* | 8/2015 | Luo | G06T 5/002 345/419 |
| 2020/0228836 A1* | 7/2020 | Schwarz | G06T 17/10 |
| 2020/0286261 A1* | 9/2020 | Faramarzi | G06T 9/001 |
| 2020/0294271 A1* | 9/2020 | Ilola | G06T 9/00 |
| 2021/0090301 A1* | 3/2021 | Mammou | G06T 5/002 |
| 2021/0409767 A1* | 12/2021 | Oh | H04N 21/8456 |

* cited by examiner

*Primary Examiner* — Van D Huynh
(74) *Attorney, Agent, or Firm* — Haverstock & Owens, A Law Corporation (57) ABSTRACT

A method of compressing meshes using a projection-based approach, leveraging and expanding the tools and syntax generated for projection-based volumetric content compression is described. The mesh is segmented into surface patches, with the difference that the segments follow the connectivity of the mesh. The dense mesh compression utilizes 3D surface patches to represent connected triangles on a mesh surface and groups of vertices to represent triangles not captured by surface projection. Each surface patch (or 3D patch) is projected to a 2D patch, whereby for the mesh, the triangle surface sampling is similar to a common rasterization approach. For each patch, position and connectivity of the projected vertices are kept. The sampled surface resembles a point cloud and is coded with the same approach used for point cloud compression. The list of vertices and connectivity per patch is encoded, and the data is sent with the coded point cloud data.

24 Claims, 11 Drawing Sheets

DENSE MESH COMPRESSION

CROSS-REFERENCE TO RELATED APPLICATION(S)

This application claims priority under 35 U.S.C. § 119(e) of the U.S. Provisional Patent Application Ser. No. 63/086,142, filed Oct. 1, 2020 and titled, "DENSE MESH COMPRESSION," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Recently, a novel method to compress volumetric content, such as point clouds, based on projection from 3D to 2D is being standardized. The method, also known as V3C (visual volumetric video-based compression), maps the 3D volumetric data into several 2D patches, and then further arranges the patches into an atlas image, which is subsequently encoded with a video encoder. The atlas images correspond to the geometry of the points, the respective texture, and an occupancy map that indicates which of the positions are to be considered for the point cloud reconstruction.

In 2017, MPEG had issued a call for proposal (CfP) for compression of point clouds. After evaluation of several proposals, currently MPEG is considering two different technologies for point cloud compression: 3D native coding technology (based on octree and similar coding methods), or 3D to 2D projection, followed by traditional video coding. In the case of dynamic 3D scenes, MPEG is using a test model software (TMC2) based on patch surface modeling, projection of patches from 3D to 2D image, and coding the 2D image with video encoders such as HEVC. This method has proven to be more efficient than native 3D coding, and is able to achieve competitive bitrates at acceptable quality.

Due to the success for coding 3D point clouds of the projection-based method (also known as the video-based method, or V-PCC), the standard is expected to include in future versions further 3D data, such as 3D meshes. However, current version of the standard is only suitable for the transmission of an unconnected set of points, so there is no mechanism to send the connectivity of points, as it is required in 3D mesh compression.

Methods have been proposed to extend the functionality of V-PCC to meshes as well. One possible way is to encode the vertices using V-PCC, and then the connectivity using a mesh compression approach, like TFAN or Edgebreaker. The limitation of this method is that the original mesh has to be dense, so that the point cloud generated from the vertices is not sparse and can be efficiently encoded after projection. Moreover, the order of the vertices affect the coding of connectivity, and different method to reorganize the mesh connectivity have been proposed. An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. Notice that in the RAW patch, the vertices may be sent in any preferred order, so the order generated from connectivity encoding can be used. The method can encode sparse point clouds, however, RAW patches are not efficient to encode 3D data, and further data such as the attributes of the triangle faces may be missing from this approach.

SUMMARY OF THE INVENTION

A method of compressing meshes using a projection-based approach, leveraging and expanding the tools and syntax already generated for projection-based volumetric content compression is described herein. Similar to the V3C approach, the mesh is segmented into surface patches, with the difference that the segments follow the connectivity of the mesh. The dense mesh compression utilizes 3D surface patches to represent a set of connected triangles on a mesh surface and groups of vertices to represent triangles not captured by surface projection. Each surface patch (or 3D patch) is then projected to a 2D patch, whereby in the case of the mesh, the triangle surface sampling is similar to a common rasterization approach used in computer graphics. For each patch, the position of the projected vertices is kept in a list, along with the connectivity of those vertices. The sampled surface resembles a point cloud and is coded with the same approach used for point cloud compression. Additionally, the list of vertices and connectivity per patch is encoded, and the data is sent along with the coded point cloud data.

In one aspect, a method comprises performing mesh voxelization on an input mesh, implementing patch generation which segments the mesh into patches including a surface mesh and unprojected triangles, performing mesh coding on the surface mesh, performing triangle coding on the unprojected triangles and generating a V3C bitstream based on the mesh coding and the triangle coding. Mesh coding includes determining and storing a positions of projected vertices along with connectivity of the projected vertices. Triangle coding includes coding triangles not captured during surface projection. Triangle coding includes coding the triangles using only vertex position and color vertex information. Triangle coding includes determining if a bounding box of connected components is smaller than a pre-defined area, unprojected triangles are moved to a separate list for independent triangle coding, and the unprojected triangles are not rasterized, but coded as vertices with associated color per vertex; otherwise, each triangle is projected to a patch, and if a projected position of a vertex is already occupied, the triangle is encoded in another patch, so the triangle is put in a missing triangles list to be processed again later. Triangle coding utilizes a triangle patch data unit. The triangle patch data unit stores a triangle as a separate triangle, a triangle strip or a triangle fan. Triangle coding further includes a color expansion implementation which writes a color of a triangle as $c_0$ $c_1$ $c_2$; $c_m$ $c_m$ $c_m$; $c_0$ $c_1$ $c_2$, where $c_m$ is a color value of a centroid position of the triangle. Triangle coding further includes color compression.

In another aspect, an apparatus comprises a non-transitory memory for storing an application, the application for: performing mesh voxelization on an input mesh, implementing patch generation which segments the mesh into patches including a surface mesh and unprojected triangles, performing mesh coding on the surface mesh, performing triangle coding on the unprojected triangles and generating a V3C bitstream based on the mesh coding and the triangle coding and a processor coupled to the memory, the processor configured for processing the application. Mesh coding includes determining and storing a positions of projected vertices along with connectivity of the projected vertices. Triangle coding includes coding triangles not captured during surface projection. Triangle coding includes coding the triangles using only vertex position and color vertex information. Triangle coding includes determining if a bounding box of connected components is smaller than a pre-defined area, unprojected triangles are moved to a separate list for independent triangle coding, and the unprojected triangles are not rasterized, but coded as vertices with associated color per vertex; otherwise, each triangle is projected to a patch, and if a projected position of a vertex is already occupied, the triangle is encoded in another patch, so the triangle is put in a missing triangles list to be processed again later. Triangle coding utilizes a triangle patch data unit. The triangle patch data unit stores a triangle as a separate triangle, a triangle strip or a triangle fan. Triangle coding further includes a color expansion implementation which writes a color of a triangle as $c_0$ $c_1$ $c_2$; $c_m$ $c_m$ $c_m$; $c_0$ $c_1$ $c_2$, where $c_m$ is a color value of a centroid position of the triangle. Triangle coding further includes color compression.

In another aspect, the system comprises one or more cameras for acquiring three dimensional content, an encoder for encoding the three dimensional content: performing mesh voxelization on an input mesh of the three dimensional content, implementing patch generation which segments the mesh into patches including a surface mesh and unprojected triangles, performing mesh coding on the surface mesh, performing triangle coding on the unprojected triangles and generating a V3C bitstream based on the mesh coding and the triangle coding. Mesh coding includes determining and storing a positions of projected vertices along with connectivity of the projected vertices. Triangle coding includes coding triangles not captured during surface projection. Triangle coding includes coding the triangles using only vertex position and color vertex information. Triangle coding includes determining if a bounding box of connected components is smaller than a pre-defined area, unprojected triangles are moved to a separate list for independent triangle coding, and the unprojected triangles are not rasterized, but coded as vertices with associated color per vertex; otherwise, each triangle is projected to a patch, and if a projected position of a vertex is already occupied, the triangle is encoded in another patch, so the triangle is put in a missing triangles list to be processed again later. Triangle coding utilizes a triangle patch data unit. The triangle patch data unit stores a triangle as a separate triangle, a triangle strip or a triangle fan. Triangle coding further includes a color expansion implementation which writes a color of a triangle as $c_0$ $c_1$ $c_2$; $c_m$ $c_m$ $c_m$; $c_0$ $c_1$ $c_2$, where $c_m$ is a color value of a centroid position of the triangle. Triangle coding further includes color compression.

DETAILED DESCRIPTION OF THE PREFERRED EMBODIMENT

A method of compressing meshes using a projection-based approach, leveraging and expanding the tools and syntax already generated for projection-based volumetric content compression is described herein. Similar to the V3C approach, the mesh is segmented into surface patches, with the difference that the segments follow the connectivity of the mesh. Each surface patch (or 3D patch) is then projected to a 2D patch, whereby in the case of the mesh, the triangle surface sampling is similar to a common rasterization approach used in computer graphics. For each patch, the position of the projected vertices is kept in a list, along with the connectivity of those vertices. The sampled surface resembles a point cloud and is coded with the same approach used for point cloud compression. Additionally, the list of vertices and connectivity per patch is encoded, and the data is sent along with the coded point cloud data.

The additional connectivity data is interpreted as a base mesh that is generated for each patch, giving the decoder the flexibility to use this additional data or not. The data could be used to improve rendering and in point filtering algorithms. Moreover, the mesh is encoded with the same principle of projection-based compression, which leads to a better integration with the current V-PCC approach.

A method to encode triangles that were not captured during surface projection is also described herein, which is common for very dense meshes. Small triangles are then gathered and coded using only their vertex position and color vertex.

State of the art in point cloud compression uses video encoders to represent point clouds as 3D patches and encodes 2D images formed by the projection of geometry and attributes into a 2D canvas. However, such methods are primarily suitable for 3D point clouds, and cannot be applied to compression of 3D meshes, since there is no proper way of compressing the connectivity of the mesh. Furthermore, meshes with sparse number of vertices, when coded with V-PCC, perform poorly due to data sparsity and poor color representation.

Methods have been proposed to extend the functionality of V-PCC to meshes as well. One possible way is to encode the vertices using V-PCC, and then the connectivity using a mesh compression approach, like TFAN or Edgebreaker. A limitation of this method is that the original mesh should be dense, so that the point cloud generated from the vertices is not sparse and can be efficiently encoded after projection. Moreover, the order of the vertices affects the coding of connectivity, and different methods to reorganize the mesh connectivity have been proposed.

An alternative way to encode a sparse mesh is to use the RAW patch data to encode the vertices position in 3D. Since RAW patches encode (x,y,z) directly, in this method all the vertices are encoded as RAW data, while the connectivity is encoded by a similar mesh compression method, as mentioned before. In the RAW patch, the vertices may be sent in any preferred order, so the order generated from connectivity encoding can be used. The method can encode sparse point clouds however, RAW patches are not efficient to encode 3D data. Moreover, further data, such as the attributes of the triangle faces, may be missing from this approach.

A novel method for compression of 3D mesh data using projections of mesh surface data and isolated triangle coding is described herein. The dense mesh compression utilizes 3D surface patches to represent a set of connected triangles on a mesh surface, as well as groups of vertices to represent triangles not captured by surface projection. Both sets of data are stored in patches (a mesh patch and a triangle patch) that are encoded in atlas data. Such approaches extend the functionality of the V3C (volumetric video based) standard that is currently used for coding of point cloud and multi-view plus depth content.

In 3D point cloud coding using video encoders, projection from 3D to 2D is used to generate the videos that will represent the point cloud. The most efficient way of generating those videos is using 3D patches, which segments the surface of the object and uses orthogonal projection to generate segmented depth images that are bundled together and used as input of video encoders. Furthermore, points that are not captured by the projection step may be encoded directly in the video signal as well. In the current point cloud standard, 3D meshes cannot be encoded, since there is no defined method to encode the connectivity of the mesh. Furthermore, the standard performs poorly if vertex data is sparse, since it cannot exploit the correlation between the vertices. Embodiments of the present invention include methods for coding of meshes using the V3C standard for coding of volumetric data. Such methods segment the mesh surfaces and a joint surface sampling and 2D patch generation. Then, encoding of each patch, the local connectivity and the position of the vertices projected to the 2D patches.

Also disclosed are methods for signaling the connectivity and vertices position, enabling the reconstruction of the original input mesh. Additionally, disclosed are methods for coding triangles that were not captured during the surface projection stage. The unprojected triangle vertices are encoded as points, and the points coordinates are directly added to the video data. Further metadata provides efficient ways of reconstructing the triangle list from the encoded vertex data encoded in video sequence and recovering the color data of the vertices of the triangle. The dense mesh compression is able to be applied to dense time-varying meshes, with mesh attributes such as texture either described by texture coordinates or using color per vertex.

Figure 1:
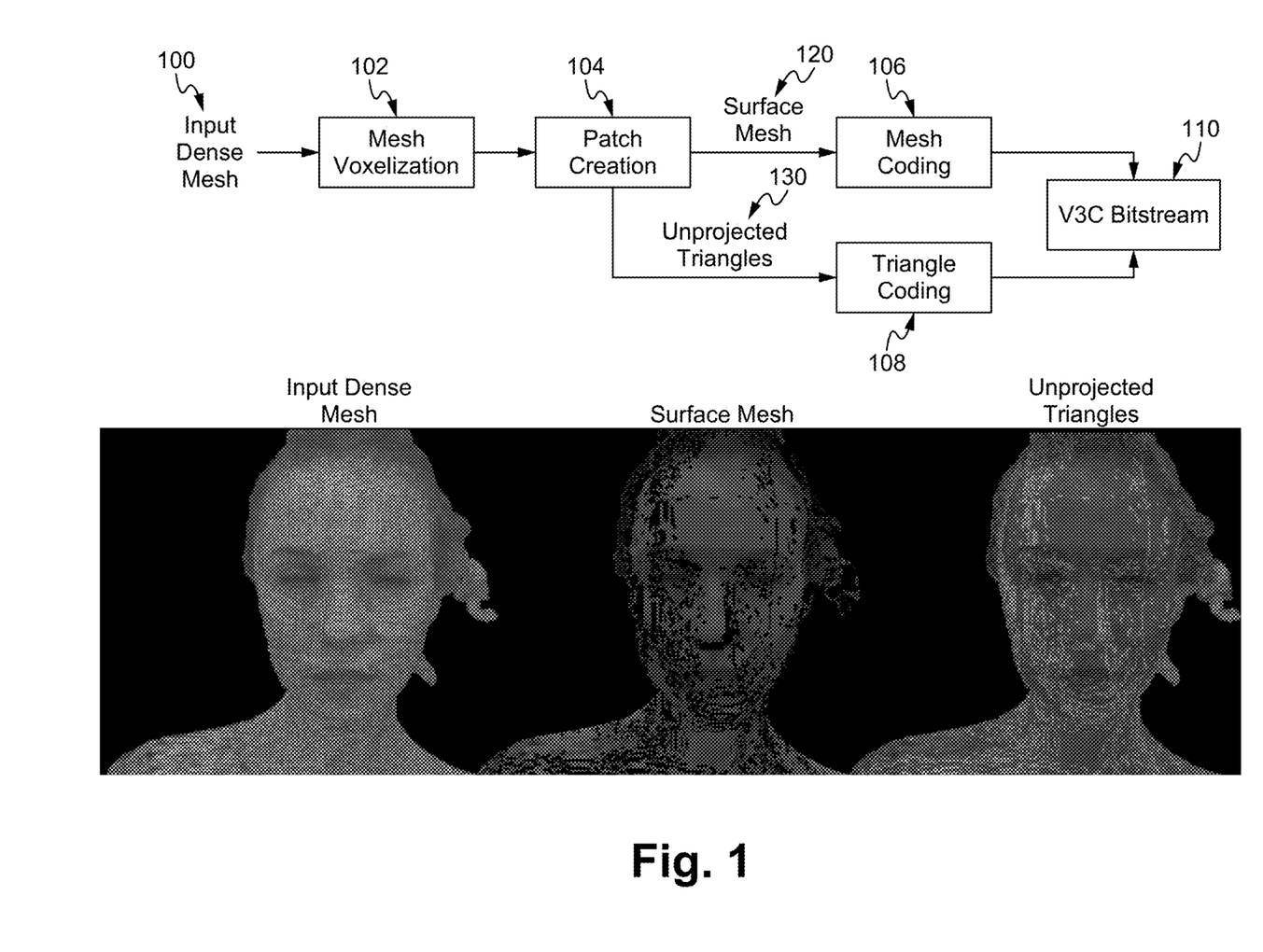
FIG. 1 illustrates a flowchart of a method of dense mesh coding according to some embodiments.

FIG. 1 illustrates a flowchart of a method of dense mesh coding according to some embodiments. In the step 100, an input (dense) mesh is received or acquired. For example, the dense mesh is downloaded (e.g., from a network device) or acquired/captured by a device (e.g., camera or autonomous vehicle).

In the step 102, mesh voxelization is performed. The mesh is able to have positions of vertices in floating point, so these positions are converted to the integer space. V-PCC and V3C assume a voxelized point cloud.

In the step 104, patch generation (or creation) is implemented. Patch generation is able to include: normal calculation, adjacency calculation, initial segmentation; refinement, patch projection, and patch rasterization. Normal calculation is calculating the normals of each triangle (e.g., cross product of the triangle's edges). Adjacency calculation involves calculating each triangle's adjacency (e.g., which triangles in the mesh neighbor or touch the current triangle or other triangles). Initial segmentation includes classifying the normal according to the orientation. For example, a normal of a triangle is able to point up, down, left, right, front, or back, and is able to be classified based on the direction/orientation. In some embodiments, the triangles are color-coded based on the orientation of their normals (e.g., all of the triangles with a normal pointing up are colored green). Refinement involves locating outliers (e.g., a single red triangle surrounded by blue triangles) and smoothing out the outliers (e.g., changing the single red triangle to match its neighbors which are blue). The refinement is performed by analyzing the neighbors and smoothing the orientation (e.g., adjusting the orientation of the normal). Once there is a smooth surface, then patch projection is performed which involves projecting the patches for a specific classification of triangles (e.g., based on orientation). With the projection, the vertices and connectivity are shown on the patches. For example, the body and face in this example are separate projections since there are triangles with different classifications separating the two. V3C and V-PCC do not understand this though; rather, V3C and V-PCC understand points, so the projection is rasterized (e.g., sampling points on the surface including the distance of the points to generate a geometry image and the attributes of the surface). The rasterized mesh surface is very similar to a V3C image. Patch generation is able to result in a surface mesh 120 and unprojected triangles 130. The unprojected triangles 130 are shown as missing spaces in the surface mesh 120. The unprojected triangles 130 may occur for any number of reasons such as occlusion.

In the step 106, mesh coding is implemented. The mesh coding includes encoding the surface mesh and is able to be the encoding described herein or in U.S. patent application Ser. 17/161,300, filed on Jan. 28, 2021, and titled, "PROJECTION-BASED MESH COMPRESSION," which is hereby incorporated by reference in its entirety for all purposes.

In the step 108, triangle coding is implemented. The triangle coding includes encoding the unprojected triangles. If the bounding box of the connected components is smaller than a pre-defined area, the triangles are moved to a separate list for independent triangle coding. The unprojected triangles are not rasterized, but coded as vertices with associated color per vertex. Otherwise, each triangle is projected to the patch. If the projected position of a vertex is already occupied, the triangle is encoded in another patch, so it goes to a missing triangles list to be processed again later.

In the step 110, the V3C bitstream is generated from the mesh coding and the triangle coding. In some embodiments, fewer or additional steps are implemented. In some embodiments, the order of the steps is modified.

Figure 2:
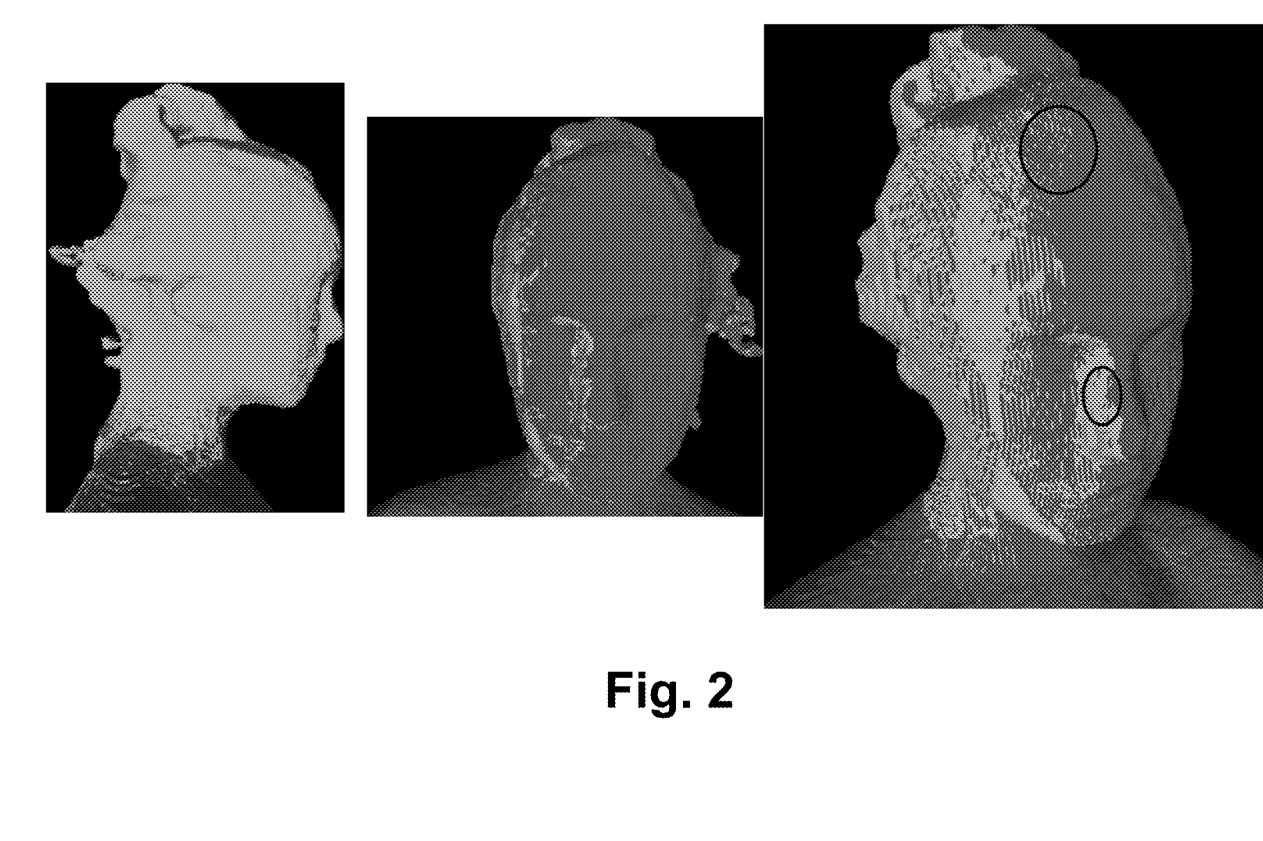
FIG. 2 illustrates a diagram of an exemplary dense mesh projection issue according to some embodiments.

FIG. 2 illustrates a diagram of an exemplary dense mesh projection issue according to some embodiments. Not all triangles have the same classification.

Figure 3:
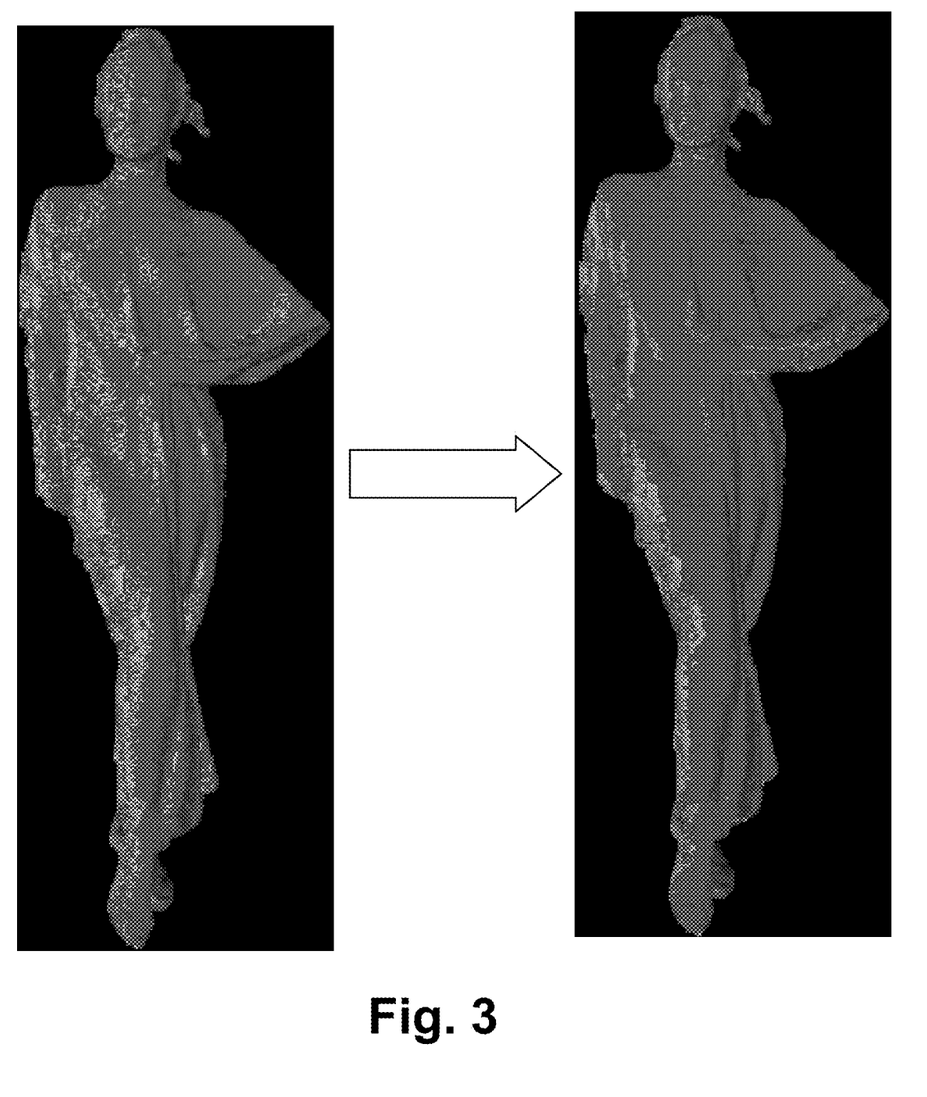
FIG. 3 illustrates a diagram of patch generation according to some embodiments.

FIG. 3 illustrates a diagram of patch generation according to some embodiments. Patch generation involves determining an adjacency neighborhood of each triangle, calculating a normal of each triangle, categorizing the triangle according to the normal, and refining the category according to the neighboring values.

Figure 4:
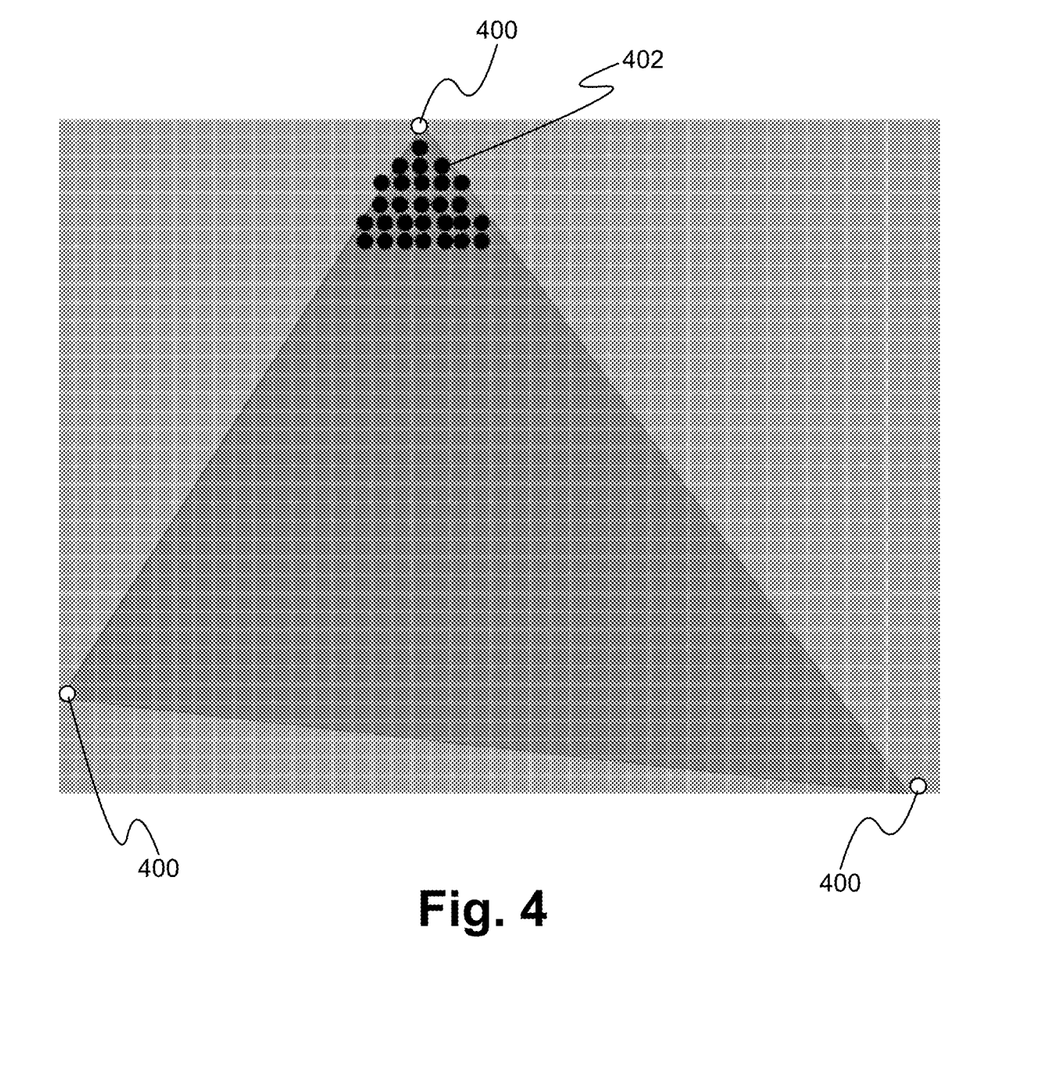
FIG. 4 illustrates a diagram of patch rasterization according to some embodiments.

FIG. 4 illustrates a diagram of patch rasterization according to some embodiments, one of the components of the patch generation process. Patch generation also includes generating connected components of triangles (triangles with the same category sharing at least one vertex). If the bounding box of the connected components is smaller than a pre-defined area, the triangles are moved to a separate list for independent triangle coding. These unprojected triangles will not be rasterized, but coded as vertices with associated color vertex. Otherwise, each triangle is projected to the patch. If a projected position of a vertex is already occupied, the triangle is coded in another patch and goes to a missing triangles list to be processed again later. Alternatively, maps are able to be used to identify the vertices that overlap and are still able to represent the triangle with overlapped vertices. The triangle is rasterized to generate the points for the point cloud representation.

The original voxelized vertices 400 are shown. The rasterized surface points 402 (added to the point cloud representation) follow the structure of the mesh, so the point cloud geometry is able to be as coarse as the underlying mesh. However, the geometry is able to be improved by sending additional positions for each rasterized pixel.

A mesh patch data unit (MPDU) is able to be utilized to store a list of points in a patch which are the vertices of the triangles, and connectivity of the mesh, which is the same even after projection. Connectivity is able to be encoded using the mesh patch data unit. A list of integer values is able to be encoded, or DPCM in the list is able to be used. More sophisticated approaches are also possible such as edgebreaker or TFAN. The (u,v) coordinate of the vertices is encoded, not the (x,y,z) coordinate. The (u, v) position is able to be encoded, or a DPCM approach is possible. The order is able to be determined by the connectivity. Parallelogram prediction is able to be used (e.g., Draco). The position of the vertices are able to be sent via an occupancy map.

The following shows an exemplary MPDU:

| mesh_patch_data_unit( patchIdx ) { | Descriptor |
|---|---|
| mpdu_2d_pos_x[ patchIdx ] | u(v) |
| mpdu_2d_pos_y[ patchIdx ] | u(v) |
| mpdu_2d_delta_size_x[ patchIdx ] | se(v) |
| mpdu_2d_delta_size_y[ patchIdx ] | se(v) |
| mpdu_3d_pos_x[ patchIdx ] | u(v) |
| mpdu_3d_pos_y[ patchIdx ] | u(v) |
| mpdu_3d_pos_min_z[ patchIdx ] | u(v) |
| if( asps_normal_axis_max_delta_value_enabled_flag ) | |
|    mpdu_3d_pos_delta_max_z[ patchIdx ] | u(v) |
| mpdu_projection_id[ patchIdx ] | u(v) |
| mpdu_orientation_index[ patchIdx ] | u(v) |
| if( afps_lod_bit_count > 0 ) | |
|    mpdu_lod[ patchIdx ] | u(v) |
| if( asps_point_local_reconstruction_enabled_flag ) | |
|    point_local_reconstruction_data( patchIdx ) | |
| mpdu_num_faces[ patchIdx ] | ue(v) |
| mpdu_num_vertices[ patchIdx ] | ue(v) |
| for( i = 0; i < pdu_num_faces[ patchIdx ] ; i++ ) { | |
|    mpdu_face_vertex[ patchIdx ][ i ][ 0 ] | u(v) |
|    mpdu_face_vertex[ patchIdx ][ i ][ 1 ] | u(v) |
|    mpdu_face_vertex[ patchIdx ][ i ][ 2 ] | u(v) |
| } | |

-continued

| mesh_patch_data_unit( patchIdx ) { | Descriptor |
|---|---|
| for( i = 0; i < pdu_num_vertices[ patchIdx ] ; i++ ) { | |
|    mpdu_vertex_pos[ patchIdx ][ i ][ 0 ] | u(v) |
|    mpdu_vertex_pos[ patchIdx ][ i ][ 1 ] | u(v) |
| } | |
| } | |

Alternative coding includes using TFAN or Edgebreaker to encode patch connectivity, using parallelogram prediction for vertices, using DPCM encoding, or using occupancy map for vertex location.

The triangle information is stored in a triangle patch data unit (TPDU). The TPDU stores a list of points in a patch which are the vertices of the triangles, the triangles are formed according to a primitive indication. The primitive indication includes: (0) separate triangles: (0 1 2), (3 4 5), (6 7 8), where every three vertices determine a triangle; (1) triangle strip: (0 1 2), (2 1 3), (2 3 4) where every new vertex generates a new triangle with the previous 2 vertices since some of the vertices are shared; and (2) triangle fan: (0 1 2), (0 2 3), (0 3 4) every two new vertices generates a new triangle centered around the first vertex.

In other words, there are many vertices, and the connectivity of the vertices is generated/determined. There are many ways of generating/determining the connectivity: separate triangles (every three vertices are encoded), a triangle strip (if the triangles share a vertices, they can be encoded as a strip) or a triangle fan (if the triangles share a single vertex, they can be encoded as a fan).

Figure 5:
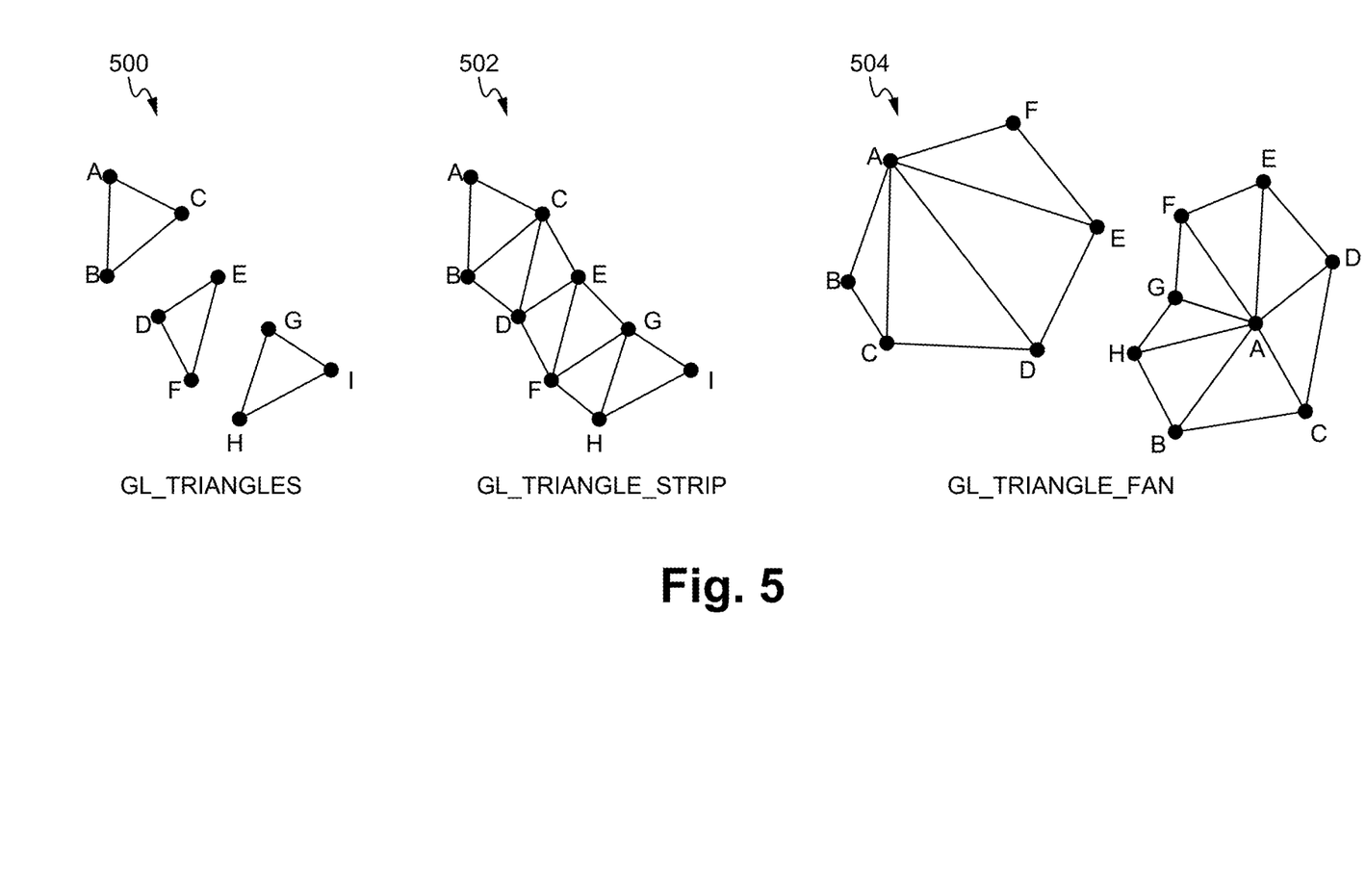
FIG. 5 illustrates diagrams of triangle groupings according to some embodiments.

FIG. 5 illustrates diagrams of triangle groupings according to some embodiments. The triangle patch data includes a list of points in the patch which are the vertices of the triangles. There are able to be separate triangles 500 (individual, unconnected triangles), triangle strips 502 (multiple, connected triangles) or triangle fans 504 (multiple, connected triangles connected at one vertex).

The triangle patch data is able to be packed using any method such as component packing (similar to packing RAW patches) or line interleaved, where a line is assigned for each component.

A color expansion changes the packing of the (x, y, z) coordinates to a line packing. The class also indicates if the color will be expanded, which is useful for textured meshes because of UV interpolation artifacts. If no expansion is used, colors are written sequentially (c1 c2 c3). Otherwise, they are written: $[c_0\ c_1\ c_2;\ c_m\ c_m\ c_m;\ c_0\ c_1\ c_2]$, where $c_m$ is the color value of the centroid position of the triangle, which is equivalent to the average color of the three vertices. With color expansion, UV coordinates should point to the center pixel.

Figure 6:
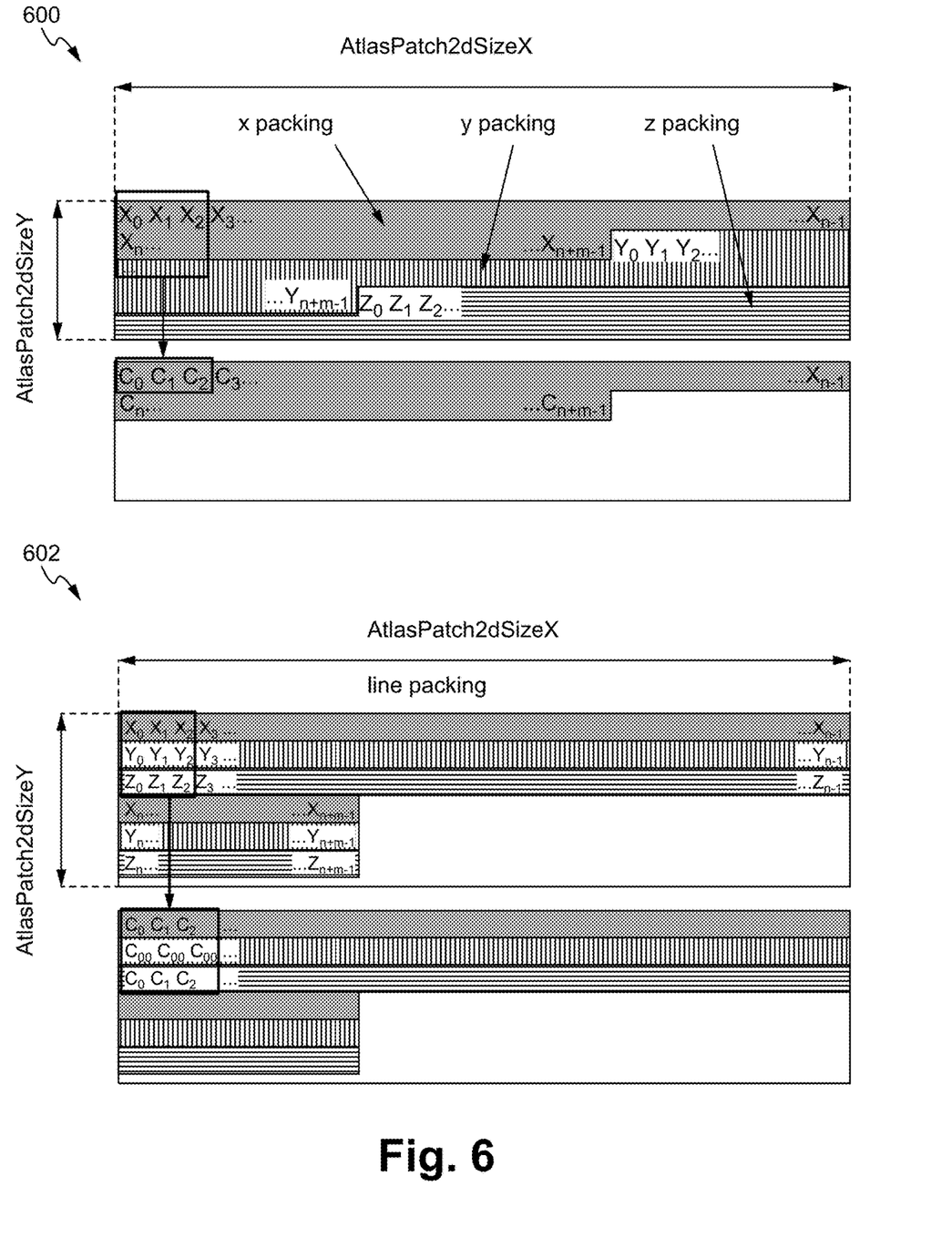
FIG. 6 illustrates diagrams of encoding of the triangles in a video image according to some embodiments.

FIG. 6 illustrates diagrams of encoding of the triangles in a video image according to some embodiments. The position of the triangles are encoded in the video image (e.g., x, y, z coordinates in the video image). There are many ways to pack the coordinates. In one example 600, all of the x-coordinates are first, then the y-coordinates and then the z-coordinates. In another example 602, a line interleave implementation is performed, which is then used to implement the color expansion.

Figure 7:
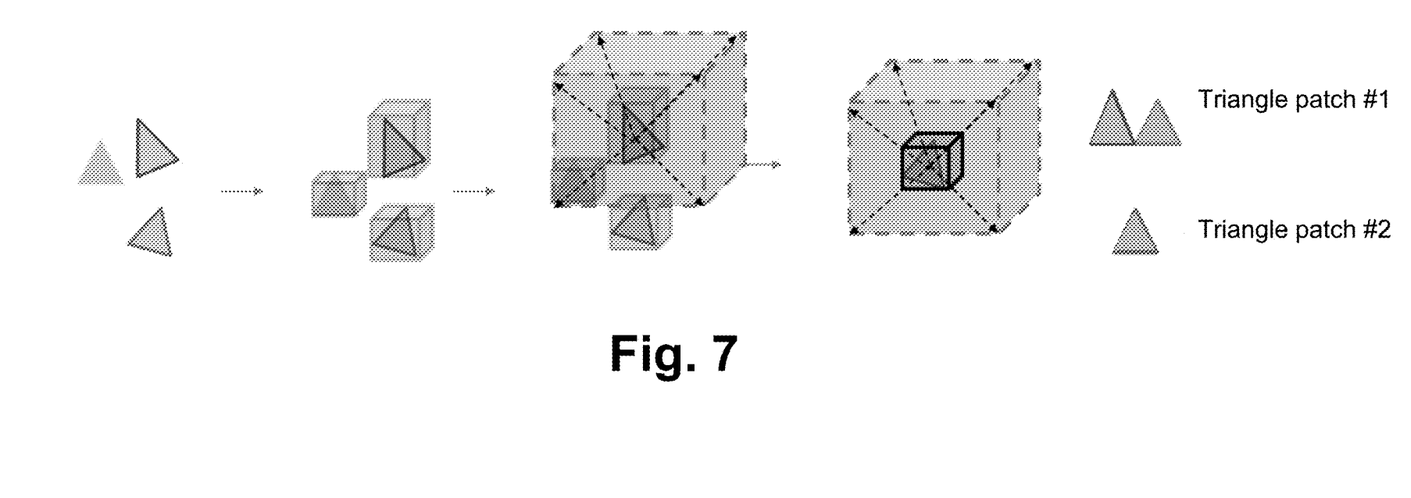
FIG. 7 illustrates diagrams of triangle collections for a patch according to some embodiments.

FIG. 7 illustrates diagrams of triangle collections for a patch according to some embodiments. A method to generate triangle patches from disconnected triangles (or connected triangles) is described. The method also guarantees that the bit depth used to then represent the vertex is within a certain value (for example, segmenting 10 bit data into 8 bit segments). The bounding box of the triangles is calculated, and if the size of the bounding box is larger than the predefined bit depth, then the triangle is removed and not coded. While the list of triangles is not empty, a selection bounding box is generated with a predefined size (2^enumBits-1) centered at the center of the bounding box of the first triangle. All of the triangles are looped over, and for each triangle, the selected bounding box is checked if it contains the triangle's bounding box. If it contains the triangle's bounding box, then the triangle is added to the triangle patch and removed from the list of triangles. For the coding of the triangles, instead of sending the 3D data, simply bounding box point, a reference point and a delta is sent.

As shown in FIG. 7, a bounding box is calculated for each of the three separate triangles, and then the selection bounding box is compared with the triangle bounding boxes, and two of the triangle bounding boxes are within the selection bounding box, so they are in the same triangle patch (e.g., triangle patch #1), and the third triangle which is not within the selection bounding box is in a second, separate triangle patch (e.g., triangle patch #2).

The following is exemplary TPDU syntax:

| triangle_data_unit( tileID, patchIdx ) { | Descriptor |
|---|---|
| if( AuxTileHeight[ TileIDToIndex[ tileID ] ] > 0) | |
|    tpdu_patch_in_auxiliary_video_flag[ tileID ][ patchIdx ] | u(1) |
| tpdu_2d_pos_x[ tileID ][ patchIdx ] | ue(v) |
| tpdu_2d_pos_y[ tileID ][ patchIdx ] | ue(v) |
| tpdu_2d_size_x_minus1[ tileID ][ patchIdx ] | ue(v) |
| tpdu_2d_size_y_minus1[ tileID ][ patchIdx ] | ue(v) |
| tpdu_3d_offset_u[ tileID ][ patchIdx ] | u(v) |
| tpdu_3d_offset_v[ tileID ][ patchIdx ] | u(v) |
| tpdu_3d_offset_d[ tileID ][ patchIdx ] | u(v) |
| tpdu_vertices_minus3[ tileID ][ patchIdx ] | ue(v) |
| tpdu_primitive_idc[ tileID ][ patchIdx ] | u(8) |
| tpdu_color_expansion_flag[ tileID ][ patchIdx ] | u(1) |
| } | |

Figure 8:
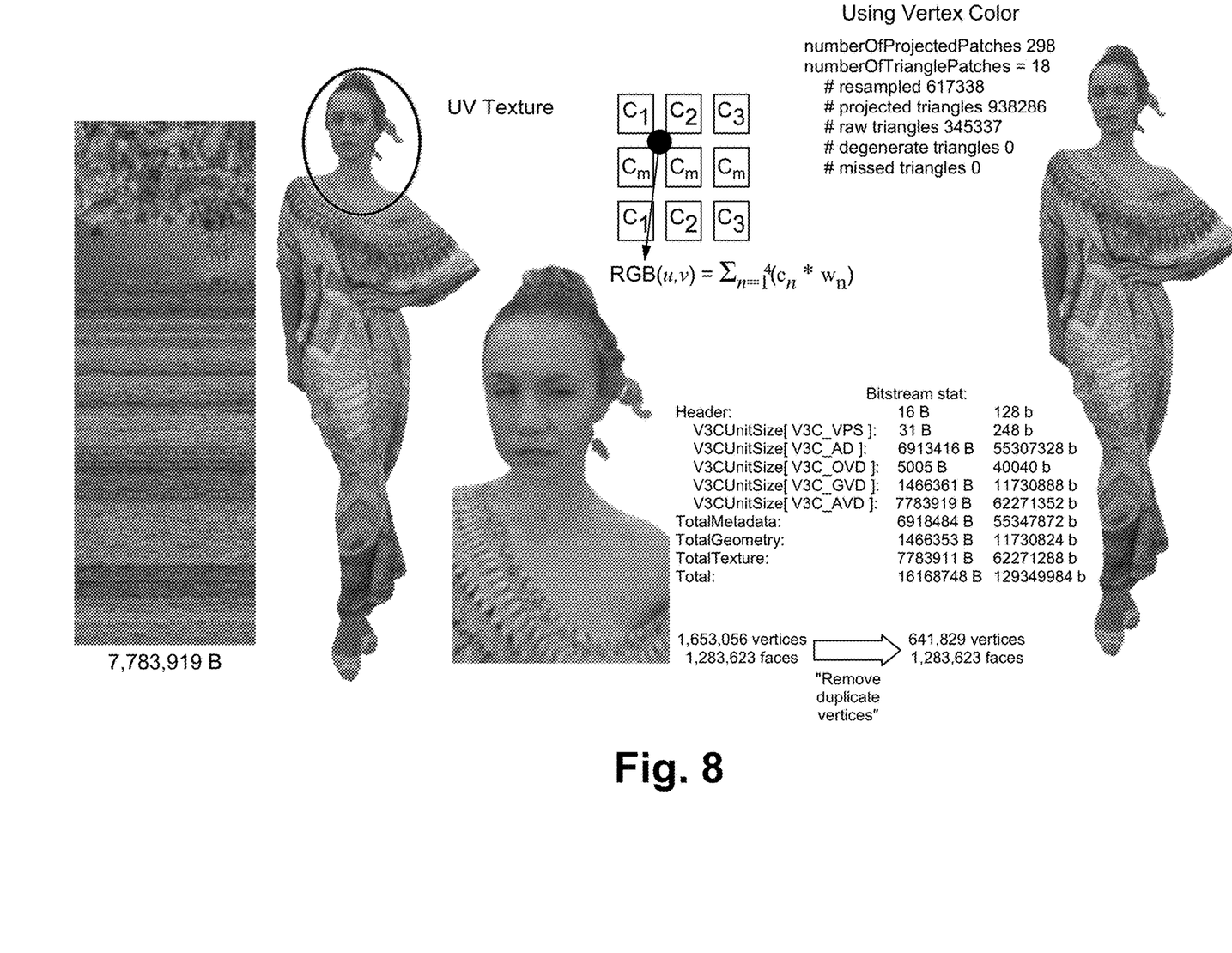
FIG. 8 illustrates an example of coding dense meshes using triangle patches without color expansion according to some embodiments.

FIG. 8 illustrates an example of coding dense meshes using triangle patches without color expansion according to some embodiments. If the triangles are placed one next to each other, then when the triangles are reconstructed, there are many artifacts. That is because the colors for reconstruction use neighboring points for interpolation which contaminates the coloring. A way to avoid the contamination is to use the vertex color instead of UV texture, but that has drawbacks as well.

Figure 9:
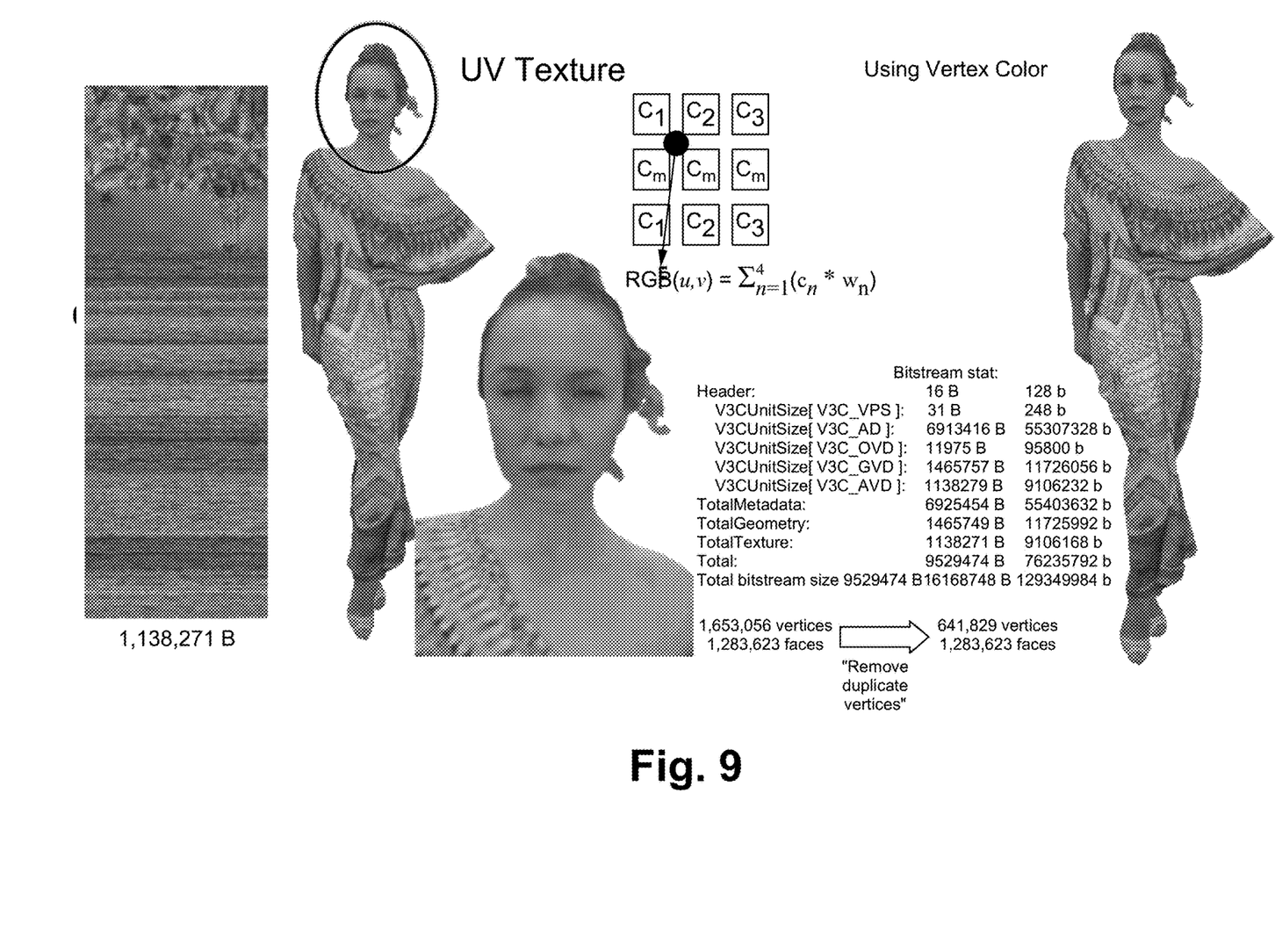
FIG. 9 illustrates an example of coding of dense meshes using triangle patches with color expansion according to some embodiments.

FIG. 9 illustrates an example of coding of dense meshes using triangle patches with color expansion according to some embodiments. In addition to the color of the vertex, the color of the triangles is included. The medium color of the triangle is also included. This results in a color that is much more accurate (e.g., fewer, if any, artifacts) and is similar to using vertex color. This implementation increases the data usage significantly. Color compression is able to be used to reduce the data usage.

To improve color compression, a separate video stream is able to be used for the triangle patches (use the auxiliary video with RAW patches). The triangles in a patch are able to be ordered according to the color of the centroid. This would cluster similar color-valued triangles and create an easier to encode image. Instead of using the (x,y,z) coordinate of the vertex, if the vertex was already encoded by a mesh patch, the patch index and vertex index packed in the (x,y,z) data are able to be sent. This also eliminates the removal duplicate vertices, as long as the vertex has been coded already.

Figure 10:
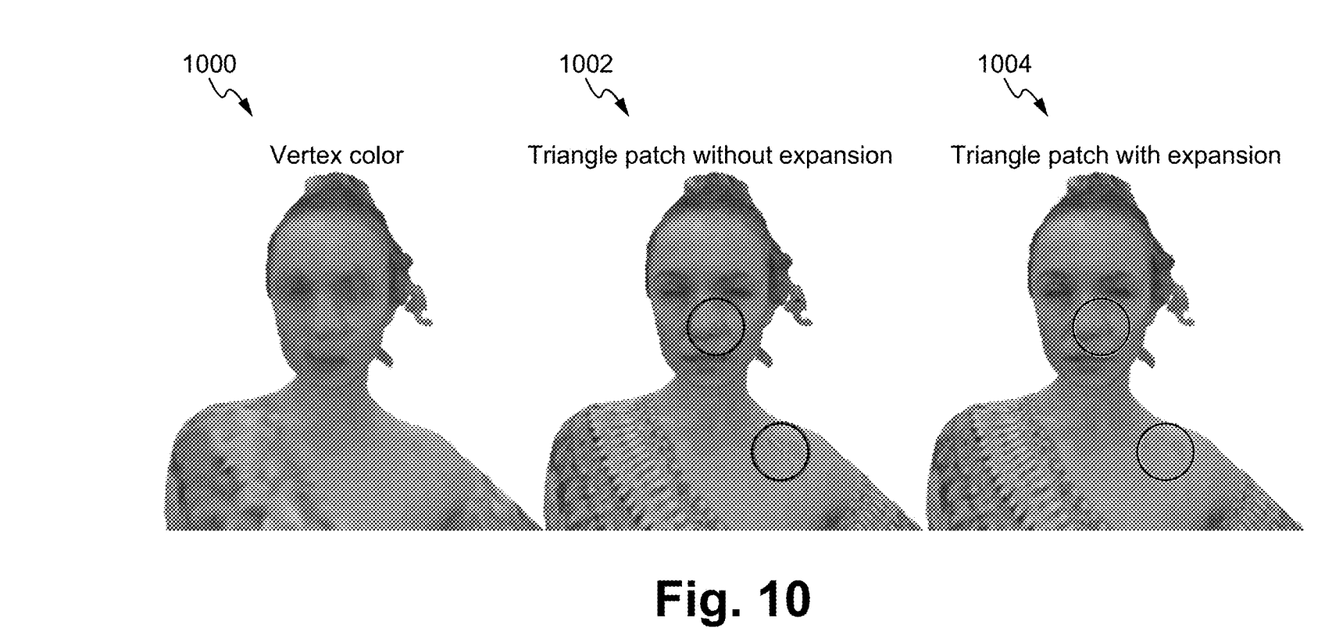
FIG. 10 illustrates images of the triangle patch implementation applied to sparse meshes according to some embodiments.

FIG. 10 illustrates images of the triangle patch implementation applied to sparse meshes according to some embodiments. The triangle patch is able to be applied to sparse meshes, but the color suffers since the whole surface will be represented by the interpolation of three colors. However, the color technique expansion is able to be used to improve texture quality. The image 1000 shows an encoding with the vertex color. Image 1002 shows an encoding without the color extension which has many artifacts. Image 1004 shows an encoding with the color extension which has better quality than the other two.

Figure 11:
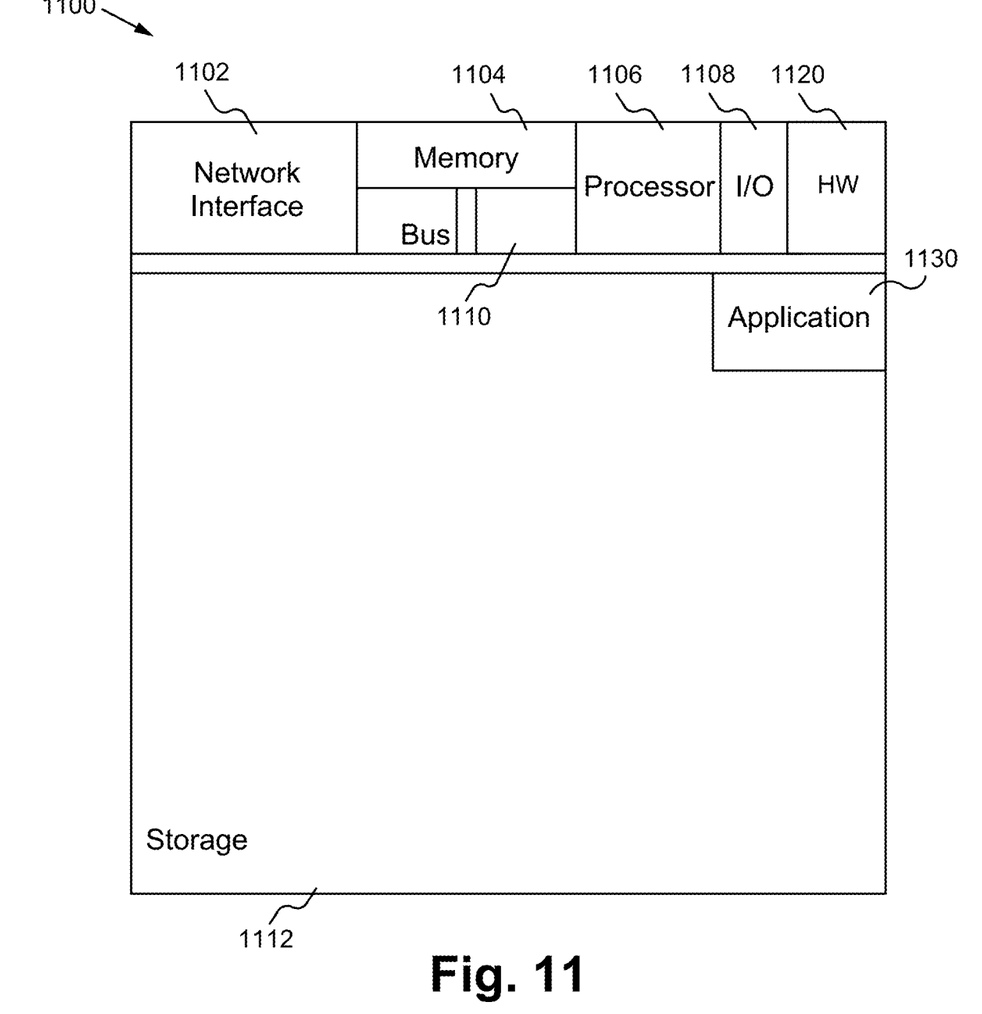
FIG. 11 illustrates a block diagram of an exemplary computing device configured to implement the dense mesh compression method according to some embodiments.

FIG. 11 illustrates a block diagram of an exemplary computing device configured to implement the dense mesh compression method according to some embodiments. The computing device 1100 is able to be used to acquire, store, compute, process, communicate and/or display information such as images and videos including 3D content. The computing device 1100 is able to implement any of the encoding/decoding aspects. In general, a hardware structure suitable for implementing the computing device 1100 includes a network interface 1102, a memory 1104, a processor 1106, I/O device(s) 1108, a bus 1110 and a storage device 1112. The choice of processor is not critical as long as a suitable processor with sufficient speed is chosen. The memory 1104 is able to be any conventional computer memory known in the art. The storage device 1112 is able to include a hard drive, CDROM, CDRW, DVD, DVDRW, High Definition disc/drive, ultra-HD drive, flash memory card or any other storage device. The computing device 1100 is able to include one or more network interfaces 1102. An example of a network interface includes a network card connected to an Ethernet or other type of LAN. The I/O device(s) 1108 are able to include one or more of the following: keyboard, mouse, monitor, screen, printer, modem, touchscreen, button interface and other devices. Dense mesh compression application(s) 1130 used to implement the dense mesh compression implementation are likely to be stored in the storage device 1112 and memory 1104 and processed as applications are typically processed. More or fewer components shown in FIG. 11 are able to be included in the computing device 1100. In some embodiments, dense mesh compression hardware 1120 is included. Although the computing device 1100 in FIG. 11 includes applications 1130 and hardware 1120 for the dense mesh compression implementation, the dense mesh compression method is able to be implemented on a computing device in hardware, firmware, software or any combination thereof. For example, in some embodiments, the dense mesh compression applications 1130 are programmed in a memory and executed using a processor. In another example, in some embodiments, the dense mesh compression hardware 1120 is programmed hardware logic including gates specifically designed to implement the dense mesh compression method.

In some embodiments, the dense mesh compression application(s) 1130 include several applications and/or modules. In some embodiments, modules include one or more submodules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

Figure 12:
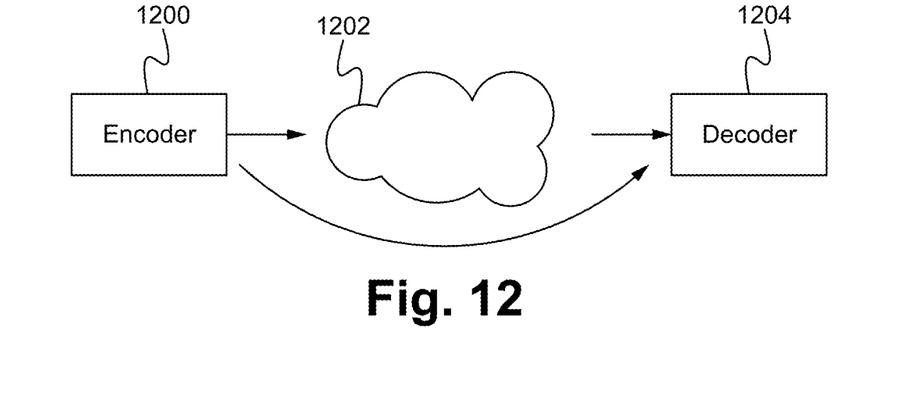
FIG. 12 illustrates a diagram of a system configured to implement the dense mesh coding according to some embodiments.

FIG. 12 illustrates a diagram of a system configured to implement the dense mesh coding according to some embodiments. An encoder 1200 is configured to implement the encoding process. As described herein any encoding is able to be implemented such as the dense mesh compression. The mesh and other information are able to be communicated directly to a decoder 1204 or over a network 1202. The network is able to be any type of network such as a Local Area Network (LAN), the Internet, a wireless network, a wired network, a cellular network, and/or any other network or combination of networks. The decoder 1204 decodes the encoded content.

To utilize the dense mesh compression method, a device acquires or receives 3D content (e.g., point cloud content). The dense mesh compression method is able to be implemented with user assistance or automatically without user involvement.

In operation, the dense mesh compression method enables more efficient and more accurate 3D content encoding compared to previous implementations.

Some Embodiments of Dense Mesh Compression

1. A method comprising:
    performing mesh voxelization on an input mesh; implementing patch generation which segments the mesh into patches including a surface mesh and unprojected triangles; performing mesh coding on the surface mesh;
    performing triangle coding on the unprojected triangles; and generating a V3C bitstream based on the mesh coding and the triangle coding.
2. The method of clause 1 wherein mesh coding includes determining and storing a positions of projected vertices along with connectivity of the projected vertices.
3. The method of clause 1 wherein triangle coding includes coding triangles not captured during surface projection.
4. The method of clause 3 wherein triangle coding includes coding the triangles using only vertex position and color vertex information.
5. The method of clause 1 wherein triangle coding includes determining if a bounding box of connected components is smaller than a pre-defined area, unprojected triangles are moved to a separate list for independent triangle coding, and the unprojected triangles are not rasterized, but coded as vertices with associated color per vertex; otherwise, each triangle is projected to a patch, and if a projected position of a vertex is already occupied, the triangle is encoded in another patch, so the triangle is put in a missing triangles list to be processed again later.
6. The method of clause 1 wherein triangle coding utilizes a triangle patch data unit.
7. The method of clause 6 wherein the triangle patch data unit stores a triangle as a separate triangle, a triangle strip or a triangle fan.
8. The method of clause 1 wherein triangle coding further includes a color expansion implementation which writes a color of a triangle as $c_0$ $c_1$ $c_2$; $c_m$ $c_m$ $c_m$; $c_0$ $c_1$ $c_2$, where $c_m$ is a color value of a centroid position of the triangle.
9. The method of clause 8 wherein triangle coding further includes color compression.
10. An apparatus comprising:
    a non-transitory memory for storing an application, the application for:
        performing mesh voxelization on an input mesh;
        implementing patch generation which segments the mesh into patches including a surface mesh and unprojected triangles;
        performing mesh coding on the surface mesh;
        performing triangle coding on the unprojected triangles; and
        generating a V3C bitstream based on the mesh coding and the triangle coding; and
    a processor coupled to the memory, the processor configured for processing the application.
11. The apparatus of clause 10 wherein mesh coding includes determining and storing a positions of projected vertices along with connectivity of the projected vertices.
12. The apparatus of clause 10 wherein triangle coding includes coding triangles not captured during surface projection.
13. The apparatus of clause 12 wherein triangle coding includes coding the triangles using only vertex position and color vertex information.
14. The apparatus of clause 10 wherein triangle coding includes determining if a bounding box of connected components is smaller than a pre-defined area, unprojected triangles are moved to a separate list for independent triangle coding, and the unprojected triangles are not rasterized, but coded as vertices with associated color per vertex; otherwise, each triangle is projected to a patch, and if a projected position of a vertex is already occupied, the triangle is encoded in another patch, so the triangle is put in a missing triangles list to be processed again later.
15. The apparatus of clause 10 wherein triangle coding utilizes a triangle patch data unit.
16. The apparatus of clause 15 wherein the triangle patch data unit stores a triangle as a separate triangle, a triangle strip or a triangle fan.
17. The apparatus of clause 10 wherein triangle coding further includes a color expansion implementation which writes a color of a triangle as $c_0$ $c_1$ $c_2$; $c_m$ $c_m$ $c_m$; $c_0$ $c_1$ $c_2$, where $c_m$ is a color value of a centroid position of the triangle.
18. The apparatus of clause 17 wherein triangle coding further includes color compression.
19. A system comprising:
    one or more cameras for acquiring three dimensional content;
    an encoder for encoding the three dimensional content:
        performing mesh voxelization on an input mesh of the three dimensional content;
        implementing patch generation which segments the mesh into patches including a surface mesh and unprojected triangles;
        performing mesh coding on the surface mesh;
        performing triangle coding on the unprojected triangles; and
        generating a V3C bitstream based on the mesh coding and the triangle coding.
20. The system of clause 19 wherein mesh coding includes determining and storing a positions of projected vertices along with connectivity of the projected vertices.

21. The system of clause 19 wherein triangle coding includes coding triangles not captured during surface projection.
22. The system of clause 21 wherein triangle coding includes coding the triangles using only vertex position and color vertex information.
23. The system of clause 19 wherein triangle coding includes determining if a bounding box of connected components is smaller than a pre-defined area, unprojected triangles are moved to a separate list for independent triangle coding, and the unprojected triangles are not rasterized, but coded as vertices with associated color per vertex; otherwise, each triangle is projected to a patch, and if a projected position of a vertex is already occupied, the triangle is encoded in another patch, so the triangle is put in a missing triangles list to be processed again later.
24. The system of clause 19 wherein triangle coding utilizes a triangle patch data unit.
25. The system of clause 24 wherein the triangle patch data unit stores a triangle as a separate triangle, a triangle strip or a triangle fan.
26. The system of clause 19 wherein triangle coding further includes a color expansion implementation which writes a color of a triangle as $c_0$ $c_1$ $c_2$; $c_m$ $c_m$ $c_m$; $c_0$ $c_1$ $c_2$, where $c_m$ is a color value of a centroid position of the triangle.
27. The system of clause 26 wherein triangle coding further includes color compression.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
performing mesh voxelization on an input mesh;
implementing patch generation which segments the mesh into patches including a surface mesh and unprojected triangles;
performing mesh coding on the surface mesh;
performing triangle coding on the unprojected triangles; and
generating a Visual Volumetric Video-based Compression (V3C) bitstream based on the mesh coding and the triangle coding, wherein triangle coding includes determining if a bounding box of connected components is smaller than a pre-defined area, the unprojected triangles are moved to a separate list for independent triangle coding, and the unprojected triangles are not rasterized, but coded as vertices with associated color per vertex; otherwise, each triangle is projected to a patch, and if a projected position of a vertex is already occupied, the triangle is encoded in another patch, so the triangle is put in a missing triangles list to be processed again later.
2. The method of claim 1 wherein mesh coding includes determining and storing a positions of projected vertices along with connectivity of the projected vertices.
3. The method of claim 1 wherein triangle coding includes coding triangles not captured during surface projection.

4. The method of claim 3 wherein triangle coding includes coding the triangles using only vertex position and color vertex information.
5. The method of claim 1 wherein triangle coding utilizes a triangle patch data unit.
6. The method of claim 5 wherein the triangle patch data unit stores a triangle as a separate triangle, a triangle strip or a triangle fan.
7. The method of claim 1 wherein triangle coding further includes a color expansion implementation which writes a color of a triangle as $c_0$ $c_1$ $c_2$; $c_m$ $c_m$ $c_m$; $c_0$ $c_1$ $c_2$, where $c_m$ is a color value of a centroid position of the triangle.
8. The method of claim 7 wherein triangle coding further includes color compression.
9. An apparatus comprising:
a non-transitory memory for storing an application, the application for:
performing mesh voxelization on an input mesh;
implementing patch generation which segments the mesh into patches including a surface mesh and unprojected triangles;
performing mesh coding on the surface mesh;
performing triangle coding on the unprojected triangles; and
generating a Visual Volumetric Video-based Compression (V3C) bitstream based on the mesh coding and the triangle coding, wherein triangle coding includes determining if a bounding box of connected components is smaller than a pre-defined area, the unprojected triangles are moved to a separate list for independent triangle coding, and the unprojected triangles are not rasterized, but coded as vertices with associated color per vertex; otherwise, each triangle is projected to a patch, and if a projected position of a vertex is already occupied, the triangle is encoded in another patch, so the triangle is put in a missing triangles list to be processed again later; and
a processor coupled to the memory, the processor configured for processing the application.
10. The apparatus of claim 9 wherein mesh coding includes determining and storing a positions of projected vertices along with connectivity of the projected vertices.
11. The apparatus of claim 9 wherein triangle coding includes coding triangles not captured during surface projection.
12. The apparatus of claim 11 wherein triangle coding includes coding the triangles using only vertex position and color vertex information.
13. The apparatus of claim 9 wherein triangle coding utilizes a triangle patch data unit.
14. The apparatus of claim 13 wherein the triangle patch data unit stores a triangle as a separate triangle, a triangle strip or a triangle fan.
15. The apparatus of claim 9 wherein triangle coding further includes a color expansion implementation which writes a color of a triangle as $c_0$ $c_1$ $c_2$; $c_m$ $c_m$ $c_m$; $c_0$ $c_1$ $c_2$, where $c_m$ is a color value of a centroid position of the triangle.
16. The apparatus of claim 15 wherein triangle coding further includes color compression.
17. A system comprising:
one or more cameras for acquiring three dimensional content;
an encoder for encoding the three dimensional content:
performing mesh voxelization on an input mesh of the three dimensional content;

implementing patch generation which segments the mesh into patches including a surface mesh and unprojected triangles;

performing mesh coding on the surface mesh;

performing triangle coding on the unprojected triangles; and generating a Visual Volumetric Video-based Compression (V3C) bitstream based on the mesh coding and the triangle coding, wherein triangle coding includes determining if a bounding box of connected components is smaller than a pre-defined area, the unprojected triangles are moved to a separate list for independent triangle coding, and the unprojected triangles are not rasterized, but coded as vertices with associated color per vertex; otherwise, each triangle is projected to a patch, and if a projected position of a vertex is already occupied, the triangle is encoded in another patch, so the triangle is put in a missing triangles list to be processed again later.

18. The system of claim 17 wherein mesh coding includes determining and storing a positions of projected vertices along with connectivity of the projected vertices.

19. The system of claim 17 wherein triangle coding includes coding triangles not captured during surface projection.

20. The system of claim 19 wherein triangle coding includes coding the triangles using only vertex position and color vertex information.

21. The system of claim 17 wherein triangle coding utilizes a triangle patch data unit.

22. The system of claim 21 wherein the triangle patch data unit stores a triangle as a separate triangle, a triangle strip or a triangle fan.

23. The system of claim 17 wherein triangle coding further includes a color expansion implementation which writes a color of a triangle as $c_0$ $c_1$ $c_2$; $c_m$ $c_m$ $c_m$; $c_0$ $c_1$ $c_2$, where $c_m$ is a color value of a centroid position of the triangle.

24. The system of claim 23 wherein triangle coding further includes color compression.

* * * * *